Figure 4:
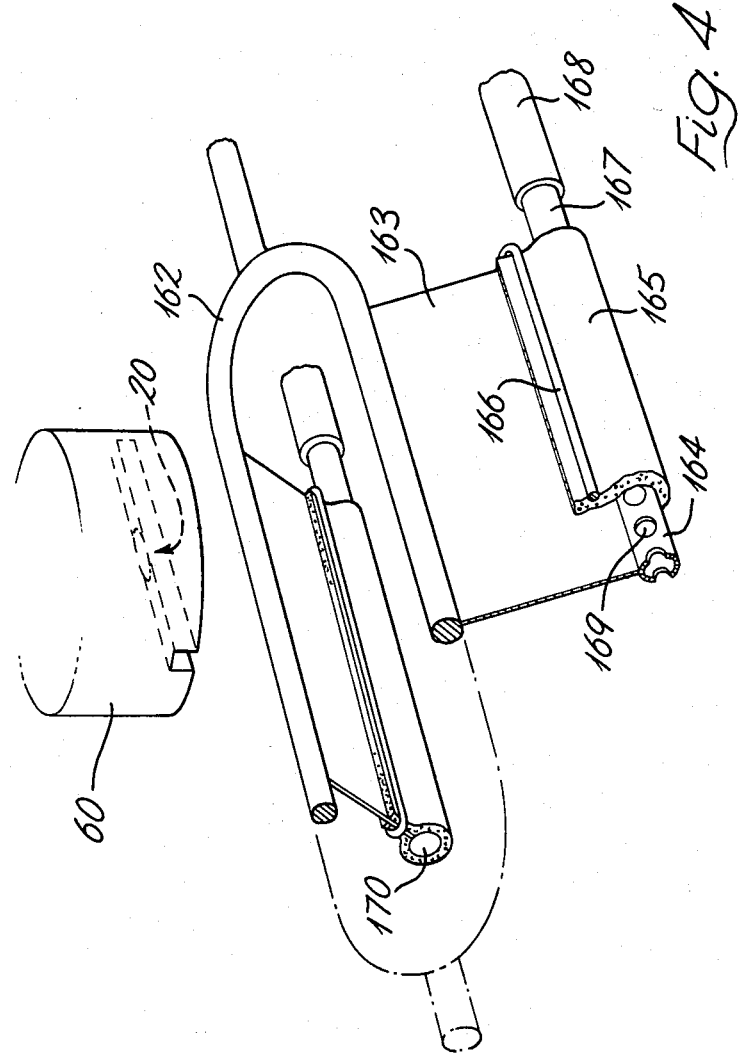

United States Patent [19]

Marchant et al.

[11] Patent Number: 4,489,894

[45] Date of Patent: Dec. 25, 1984

[54] INDUCTIVELY CHARGED SPRAYING APPARATUS

[75] Inventors: John A. Marchant, Bedford; John F. Hughes, Southampton, both of England

[73] Assignee: National Research Development Corporation, London, England

[21] Appl. No.: 352,452

[22] Filed: Feb. 25, 1982

[30] Foreign Application Priority Data

Feb. 27, 1981 [GB] United Kingdom ............... 8106206

[51] Int. Cl.³ .............................................. B05B 5/00
[52] U.S. Cl. ................................................... 239/693
[58] Field of Search ............... 239/690, 693, 706, 707

[56] References Cited

U.S. PATENT DOCUMENTS

| | | | |
|---|---|---|---|
| 2,785,351 | 3/1957 | Renner | 239/703 X |
| 2,901,177 | 8/1959 | Norris | 239/703 |
| 2,989,241 | 6/1961 | Badger | 239/703 |
| 3,010,428 | 11/1961 | Sedlascik | 239/703 X |
| 3,086,712 | 4/1963 | Frazier | 239/224 X |
| 3,121,533 | 2/1964 | Sedlacsik, Jr. | 239/703 |
| 3,221,992 | 12/1965 | Sedlacsik, Jr. et al. | 239/703 |
| 3,281,860 | 10/1966 | Adams et al. | 239/102 X |
| 3,285,516 | 11/1966 | Waldrum | 239/102 X |
| 3,679,132 | 7/1972 | Vehe et al. | 239/4 |
| 4,004,733 | 1/1977 | Law | 239/3 |
| 4,009,829 | 3/1977 | Sickles | 239/705 |
| 4,043,507 | 8/1977 | Wace | 239/4 X |
| 4,148,932 | 4/1979 | Tada et al. | |
| 4,198,781 | 4/1980 | Dykes | 239/3 X |
| 4,215,818 | 8/1980 | Hopkinson | 239/3 |
| 4,258,409 | 3/1981 | Porter | 239/706 X |
| 4,275,838 | 6/1981 | Fangmeyer | 239/703 X |
| 4,275,846 | 6/1981 | Coffee | 239/690 |
| 4,356,528 | 10/1982 | Coffee | 239/690 X |
| 4,362,275 | 12/1982 | Coffee | |

FOREIGN PATENT DOCUMENTS

| | | | |
|---|---|---|---|
| 248444 | 12/1963 | Australia | |
| 233700 | 10/1962 | Austria | 239/693 |
| 608728 | 1/1979 | Fed. Rep. of Germany | 239/693 |
| 2839013 | 3/1979 | Fed. Rep. of Germany | 239/223 |
| 665655 | 1/1952 | United Kingdom | |
| 885597 | 12/1961 | United Kingdom | |
| 887450 | 1/1962 | United Kingdom | |
| 891342 | 3/1962 | United Kingdom | |
| 917683 | 2/1963 | United Kingdom | |
| 923392 | 4/1963 | United Kingdom | |
| 1012129 | 12/1965 | United Kingdom | |
| 1037936 | 8/1966 | United Kingdom | |
| 1107060 | 3/1968 | United Kingdom | |
| 1202117 | 8/1970 | United Kingdom | |
| 1268391 | 3/1972 | United Kingdom | |
| 1303625 | 1/1973 | United Kingdom | |
| 1307878 | 2/1973 | United Kingdom | |
| 1311464 | 3/1973 | United Kingdom | |
| 1326173 | 8/1973 | United Kingdom | |
| 1335071 | 10/1973 | United Kingdom | |
| 1435181 | 5/1976 | United Kingdom | |
| 1538931 | 1/1979 | United Kingdom | |
| 1587952 | 4/1981 | United Kingdom | |
| 2093734 | 9/1982 | United Kingdom | 239/707 |

OTHER PUBLICATIONS

A. J. Arnold & B. J. Pye, Spray Application with Charged Rotary Atomisers, British Corp. Protection Council, 7, 30, 1981, pp. 109–117, Monograph 24, May 1980.

Primary Examiner—John J. Love
Assistant Examiner—Jon M. Rastello
Attorney, Agent, or Firm—Cushman, Darby & Cushman

[57] ABSTRACT

A spraying apparatus to deliver inductively charged spray, for example to crops. The apparatus includes a spray head and electrodes to apply a potential difference in the region of the spray head to charge spray. An aspirating means is arranged to remove liquid deposited on an electrode to reduce interference with the charging process. When the spray liquid is to be at high potential in the apparatus a long high resistivity supply tube may be provided. The aspirating means may be operated by spray liquid bled from a pressurized supply spray liquid.

16 Claims, 4 Drawing Figures

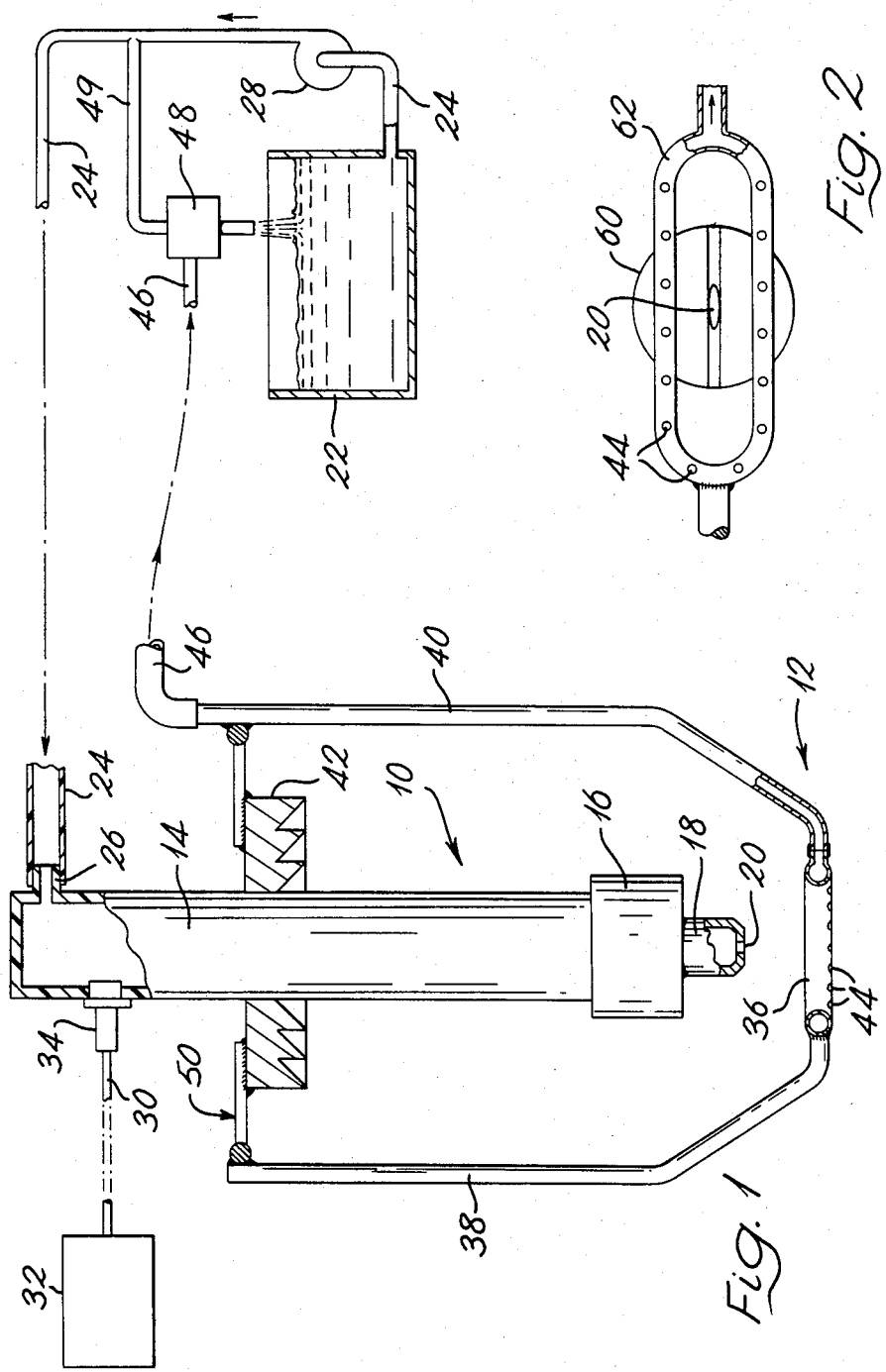

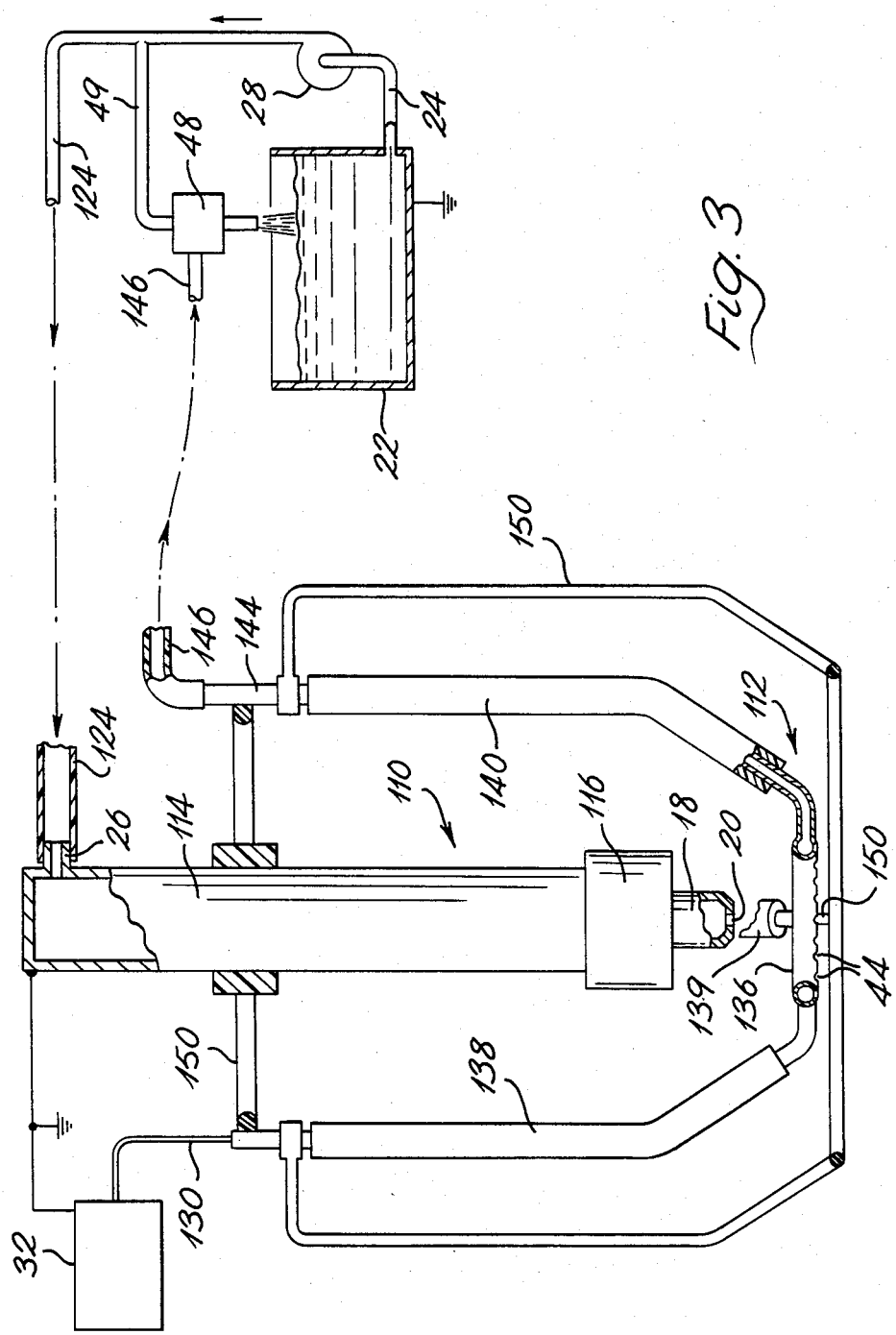

INDUCTIVELY CHARGED SPRAYING APPARATUS

The invention relates to inductively charged spraying apparatus particularly for use in the spraying of growing crops.

Electrostatic spraying is known to be suitable for use in industrial applications, such as paint spraying, where the conditions of operation can be artificially controlled. Although conditions become much more variable, the principle of applying an electrically charged spray is also attractive for agricultural use since the surfaces of a growing plant are effectively maintained at earth potential and spray which would otherwise fall to the ground or drift away is likely to be intercepted. It is additionally advantageous in the use of pesticides that deposition on the underside of the leaves readily occurs.

The form of spray required will depend partly on the nature of the crop and its habit of growth and partly on the atmospheric conditions. Economy in the use of a concentrated formulation of spray liquid can be obtained by producing a mist of very small droplets. However such a spray must be used in suitable conditions of low air-movement and in the absence of any significant velocity towards the ground has little probability of penetrating a tall or thick growth of foliage. For such crops it may be advantageous to use a pressurised spray which imparts a significant velocity to the droplets in a chosen direction. Penetration is then improved but generally the area covered is more limited. Processes of spray production are further distinguished according to the methods of atomising and of charging. Atomisation may be produced mechanically by disruption at a nozzle, as in the pressurised spray; or by disruption at the edge of a spinning disc; or electrically in the presence of a strong field. The term "sprayhead" will be used to denote atomisation mechanisms generally. Charging may be produced by the attachment of isolated charges from a corona discharge, in which case the charged spray will usually be of the same polarity as the corona electrode and will be repelled from it. Corona charging however is uneconomic in the sense that little of the discharge current is usefully applied. An alternative method is to charge by induction either remotely from earth or from a local induction electrode. In the latter case, which is preferred because lower potentials are involved, charge is produced on the surface of the liquid just before atomisation by setting up a field in a relatively small gap between the local electrode and the liquid surface. The difficulty which arises in this mode of operation is that, because charge separation occurs in the liquid, the charged spray is of opposite polarity to the local electrode and the resultant force of attraction causes a degree of surface wetting which is sufficient to interfere with the charging process.

It is an object of the invention to provide improvements in inductively charged spraying apparatus.

In accordance with the invention there is provided an electrostatic spraying apparatus comprising a spray liquid supply means, a sprayhead having a spray liquid inlet and a spray exit, first and second electrode means supported in the apparatus to apply a potential difference in the region of the spray exit whereby emergent spray is inductively charged and aspirating means for at least one electrode to remove liquid deposited on the electrode.

The first electrode may be associated with the sprayhead to be in contact with supplied spray liquid. The second electrode may be spaced from the spray exit and provided with the aspirating means.

In a preferred form the second electrode means comprises a hollow body having a wall portion and providing one or more apertures to allow the passage to the interior of the body of liquid deposited on the wall.

The hollow body may be at least partly of conductive material when the spray liquid is of a non-conductive kind.

The aspirating means for such forms of second electrode means may include a connecting tube between a source of reduced air pressure and the interior of the body. The connecting tube may also provide supporting means for the second electrode means.

The source of reduced air pressure may include a liquid jet pump and the pump liquid may be provided by a reservoir which also supplies the sprayhead.

The aspirated liquid may be returned to the reservoir.

There is particular interest in apparatus in which atomisation occurs at a jet or jets as a result of a pressurised supply of liquid or liquid and air in combination, the size of the atomised particles having a predetermined relationship to the inlet pressure.

The sprayhead may then comprise a single jet producing a solid or hollow cone or fan of spray and the second electrode may be formed as a circular or elongate loop to preserve a substantially uniform spacing between the liquid surface and the nearest point on the electrode.

Alternatively the sprayhead may comprise a circular or linear array of jets and the second electrode may be formed as a correspondingly circular or elongate loop.

The sprayhead may be maintained at earth potential and the second electrode may be maintained at an elevated potential.

Alternatively the sprayhead may be at the elevated potential and the second electrode at earth potential.

The second electrode may then be arranged as a safety guard to prevent contact by the operator with the sprayhead and in that respect the alternative arrangement is preferred.

When the sprayhead is at elevated potential the liquid reservoir may be electrically isolated from earth but it is preferred that it should have an electrical connection to earth and that the liquid is delivered to the nozzle along a path arranged to provide a high electrical resistance.

In one form the path may comprise the bore of a long resistive walled tube. The length may be related to the resistivity of the liquid to prevent the leakage current from exceeding a predetermined value.

In another form where the electrode provided with aspirating means is for use at a potential other than earth potential the aspiration flow path means may be long to reduce electrical leakage from the electrode through the flow path means and any liquid therein.

The second electrode may include at least a portion formed of porous material through which the aspirating means can act to remove deposited liquid. The porous material may be supported away from the spray exit by support means in the second electrode. The support means for the porous material may act to collect liquid.

In a spraying arrangement for field use there may be at least one spraying apparatus as described above together with a supply means including a spray liquid reservoir, spray liquid pump means to force liquid from the reservoir to the spray head, aspiration means to provide a sub-ambient pressure source for the aspirating means, power supply means to exert said potential difference, and support means to maintain the at least one spraying apparatus in a spray delivering configuration for directed delivery of charged spray liquid.

The spraying arrangement may be arranged for vehicle mounting or it may be arranged for hand-held use.

An embodiment of the apparatus of the invention and the manner of operation will now be described with reference to the accompanying drawings in which:

FIG. 1 represents diagrammatically a sprayhead and electrode assembly in accordance with the invention; and FIG. 2 represents from below a diagrammatic view of alternative sprayhead and electrode members for the assembly of FIG. 1, FIG. 3 represents diagrammatically another embodiment of the invention, and FIG. 4 represents a perspective diagrammatic view of a spray head and electrode members embodying the invention.

Referring now to FIG. 1 an assembly comprising a sprayhead 10 and an electrode unit 12 is shown, partly in section, mounted vertically for the downward spraying of a liquid of significant electrical conductivity. Sprayhead 10 comprises a hollow inlet column 14 of insulating material, closed at the upper end and having at the lower end a chamber 16 which carries a commercially available nozzle 18 of brass or similar material. A single hole 20 in the tip of nozzle 18 is arranged to produce a hollow conical spray pattern of about 80° apical angle. Liquid to be sprayed is supplied from a reservoir 22 through a tube 24 to an inlet position 26 near the upper end of inlet column 14. The liquid pressure required for the desired operating characteristics of the nozzle is provide by a pump 28 connected into tube 24. An electrical input lead 30 is connected in the present embodiment between the high voltage terminal of a supply unit 32 and a bushed terminal 34 set in the wall of inlet column 14. A conductive portion of terminal 34 which projects within column 14 makes contact with incoming liquid.

The electrode unit 12 comprises a tubular ring electrode 36 which is suspended by metallic support legs 38, 40 from a collar 42 on column 14. Electrode 36 is mounted coaxially with column 14 to lie in a plane which is at the general level of the tip of nozzle 18 or slightly above or below that level. In the position represented in FIG. 1 electrode 36 is below the exit level of nozzle 18 by a distance of about 10 mm and the diameter of electrode 36 is about 30 mm. Electrode 36 includes a hollow body providing one or more apertures to allow the passage, by aspiration, to the interior of the hollow body of liquid deposited on the electrode. In order to minimise the electric intensity at the surface of electrode 36 the electrode is formed from tubing of round section, about 5 mm in diameter. At or near the lowest periphery of electrode 36 the tubular wall is pierced by a succession of holes 44 closely spaced round the circumference. The hole size is not critical but should be large enough to allow liquid to be drawn through the holes to the inside of the tube under reduced pressure but small enough to prevent liquid from readily falling through the hole from the inside. A diameter of about 0.5 mm is suitable. Support leg 38 is a solid rod bent outwards so that for its whole length it is at a greater spacing from nozzle 18 than is electrode 36. Support leg. 40 is similarly shaped but is made from tubing which is soldered into the wall of electrode 36 to provide a suction passage. At the upper open end of leg 40 is connected a length of tubing 46 which leads to a pump 48, the output from which is returned to reservoir 22. Pump 48 is required to produce a pressure reduction of only a few millibars below atmospheric pressure and a jet pump, or ejector, having a flow control valve and operating on a supply derived in a tube 49 from the main inlet flow in tube 24 can be used for this purpose.

Collar 42 includes a wire ring or a spider 50 which carries legs 38, 40 and is arranged to be electrically connected to earth either directly or through the framework of a mobile machine if the spraying unit is mounted for use in this way. Since some of the lighter spray particles may drift upwards from the nozzle to be deposited on the ring 50 and on adjacent surfaces the underside of collar 42 is provided with drainage grooves terminating in a toothed edge 52 which serves to intercept deposited liquid. Such liquid would otherwise run down column 14 to the nozzle to cause electrical leakage.

In operation, if only the liquid supply pump 28 is switched on, a conical pattern of uncharged spray is produced from nozzle 18. It is an advantage of the pressurised spray that, although dependent on the pressure of the supply, drop production is substantially invariant with other conditions of operation. Thus the spray can continue to be used even though the high-voltage power supply may fail.

When supply unit 32 is switched on at say 5 kV the liquid reaching nozzle 18 is maintained at that potential and immediately outside the nozzle an electric field is created which corresponds to the potential difference of 5 kV between electrode 36 and the liquid at the nozzle exit (or the nozzle itself). By a flow of current through the sheet of liquid which extends from the nozzle hole 20 in the preliminary stage of atomisation a charge is induced on to the surface of the sheet and is carried away by the resultant droplets. In the presence of electrode 36 at earth potential the charged particles experience a force of outward deflection from the original conical path so that the apical angle of the cone is increased. A small proportion of spray particles are sufficiently deflected to be deposited on elctrode 36 where they readily form cusped extensions to the electrode profile at which the electric field is strong enough for a corona discharge to occur. The inductive charging effect then either fails or is greatly reduced.

By operating the aspirator however, that is by causing pump 48 to reduce the pressure in tube 46 and thence within leg 40 and within electrode 36, the deposited drops of liquid on the outer surface of electrode 36 are drawn through the holes 44. In this way the electrode surface is kept free of any accumulation of liquid, although a film will always remain, and the efficiency of the charging process is maintained. Since the aspirated liquid is returned to reservoir 22 there is no wastage of liquid. If, as indicated in a previous paragraph, the reduction in pressure is induced in a jet pump by the main inlet pressure the aspirator action is automatically effective as soon as pump 28 is switched on. It is desirable to recover the liquid not directed as spray for several reasons. The chemicals involved are usually expensive. Loss of liquid from the spray leads to erroneous dosage rates and either insufficient spray application or an uncertain margin for the loss. Liquid drops falling on the plants can cause damage by the large quantity of chemical at one spot. Liquid drops on the soil or operator can be taken elsewhere and cause damage to other crops.

Nozzle 18 has been described as having a single circular hole 20 to produce a hollow conical spray pattern. Different spray patterns may be desirable for different crops, the simplest alternative being a wedge-shaped or fan-shaped distribution for which a nozzle having a suitably formed orifice is commercially available. FIG. 2 shows from below only the relevant features of such a fan nozzle 60 and a correspondingly elongate loop form of electrode 62. The loop is formed so that a substantially similar electric field is experienced by all parts of the fan-shaped liquid sheet. Electrode 62 is provided with aspirator holes 44 and the arrangement is generally similar to that of FIG. 1. Electrodes may be designed on the same basis for nozzles having a plurality of holes in circular or linear array.

The conductivity of the liquid must be taken into account in several aspects of design of the apparatus. The first consideration is the degree of conductivity which is necessary to enable the charging process to proceed. In the simplest picture a sheet or a thread of liquid extending from the nozzle and exposed to an electric field must provide a leakage path to the supply circuit in order to retain a net charge on the droplets formed as the sheet or thread breaks up.

A numerical estimate can be made as to the suitability of a liquid by considering that charge must flow within the time of exposure of the liquid to the field. For example, for a nozzle operated at a pressure of the order of 4 bars and almost independently of nozzle size the initial jet velocity is about 20 meters/sec. If the jet is unbroken over an axial distance of (say) 10 mm the liquid will escape the influence of the field in about 0.5 ms. Provided the product (resistivity x permittivity) is below this value effective charging will result. For water the product is equal to about 10 ns so that a factor of $10^4$ or more relative to water is available to accommodate materials of higher resistivity.

The conditions at a metal nozzle may differ from the liquid thread concept in enabling charging to occur in the field applied to the thin layer of liquid which instantaneously is present at the surface of the nozzle. For liquids of relatively low resistivity it is likely that an insulating material such as a plastics or ceramic material could be used not only for column 14 but also advantageously for nozzle 18. The liquid would then provide a continous conductive path and the field distortion caused by the presence of the metallic surface would be avoided.

A further possibility is that electrode 36 is made from insulating material. A conducting film can be applied to the surface but if this is omitted the surface will receive a conductive layer of liquid as soon as spraying is started. By means of the connection provided by the support legs 38, 40 the wetted surface of electrode 36 is maintained at earth potential. An advantage of such an arrangement is that electrode 36 can be made readily and cheaply replaceable in case of blockage of the aspiration holes 44 or to provide a different form of aspiration aperture such as a slot. Thus in such an embodiment support leg 38 can carry an attachment clip to fit the ring of electrode 36 at one end of a diameter and a plug-in tubular connection is formed in the wall of electrode 36 at the other end of the diameter to engage with tubular support leg 40.

In the consideration of optional variations in the materials of construction of the nozzle and the electrode, the conductivity of the liquids commonly used for spraying can be used to advantage. The problem remains however that once liquid which remains within the spraying system has been raised to an elevated voltage it must either be isolated or returned to earth potential for reasons of operator safety. An isolated reservoir, however, represents a substantial capacitance and is dangerous when it is charged to a potential of several kV. It is preferred that the reservoir should be at earth potential provided that the leakage current from the HT connection at the nozzle can be restricted to an acceptable and predetermined level. It has been found that the delivery tube 24, if made from a strong, flexible and highly insulating material such as nylon, can have a small bore and an extended length such that leakage through the liquid is less than 10 $\mu$A per kV. The result for any chosen combination of length and bore is easily calculated and the combination which is favoured will of course depend on the pressure required at the nozzle and the pressure available at the pump 28. The pressure drop along the tube for a given volumetric flow rate is very sensitive to the bore dimension (the inverse fifth power) and length is the preferred variable. A long tube can be accommodated compactly by coiling or by stacking straight lengths of the tube joined for continuity by means of U-pieces at each end. For the nozzle 18 having a flow rate of 1.5 mL/s a pressure drop along the tube of less than 10% of the nozzle pressure is found for a water supply of 110 M$\Omega$ resistance. For the same tube, to supply the nozzle 60 having a flow rate of 4.8 mL/s, the pressure drop is about 40% of the correspondingly lower nozzle pressure so that generally the available working pressure of the pump is not a limitation.

The leakage current for water, in this experiment, is still undesirably high relative to the current carried by the charged spray and a further increase in length or a small reduction in bore size, if commercially available, is indicated. For a liquid of higher resistivity there is no difficulty in defining a suitable supply tube.

Experiments have been conducted which demonstrate the value, in terms of controlled deposition, of inductive charging of the pressurised spray produced by the nozzles illustrated in FIGS. 1 and 2. For example by measuring the deposit on metal targets in a wind tunnel, for an air speed of 2 m/s the deposition over the first meter of drift distance was found to be twenty times as great for the charged spray as for the uncharged spray. Measurements on the mean drop size and size distribution showed insignificant variation between the charged and uncharged state, thus confirming that the atomisation process considered is predominantly mechanical. There is considerable difficulty in establishing consistency of charge measurement between different experimenters in different situations and while it is thought that charge:mass ratios between 0.5 and 1.0 mC/kg (dependent on the nozzle design) are representative of operation at 5 kV in these experiments, the response of the deposition pattern to the presence of charge is considered of greater significance.

Charge measurements have also been made which establish the value of providing for the continous removal of deposited liquid from the induction electrode in accordance with the invention. Thus at 5 kV, a voltage which produces an effective but not very high field intensity in the electrode-nozzle gap, an increase in charge:mass ratio of at least 50% is observed. This improvement is assumed to be due to the prevention of the loss of charge from the deposited liquid which is otherwise caused by an invisible corona discharge. At higher voltages in the absence of aspirator operation the indicated charge rapidly becomes unstable. Cusps are formed on the surface of the deposited liquid and sparking can be observed between the cusps and the electrode 36.

It will be apparent that operation of the apparatus as described remains identical in principle if the polarities are reversed, the nozzle and the liquid supply being then at earth potential. There is in fact then no contribution to charging by induction from earth but the local induction electrode is in any case assumed to be predominant. The problem of leakage from the HT supply through the liquid delivery tube to earth is avoided but leakage from the induction electrode through the aspirator line must be taken into account and may be made acceptably small in a manner similar to that described. The presence of the high voltage electrode and support assembly re-introduces a safety problem which can be solved by routine precautions but which is avoided by the preferred high voltage nozzle embodiment.

FIG. 3 shows another embodiment of the invention in this case with the electrode unit 112 arranged for use at a potential other than earth. It is believed that in some applications there is an advantage in forcing the spray particles past a high-potential electrode towards an earthed target such as a plant.

The spray head 110 in FIG. 3 is basically spray head 10 of FIG. 1 with modifications to the electrical arrangement to use it as the earth electrode. The body 114 can be of conductive material if preferred or the spray liquid therein can be earthed via an electrode as described above for supply electrode 34. The liquid supply 124 does not have to provide any insulation and the whole supply means can be earthed as indicated by the earth symbol on reservoir 22. The high potential from power supply unit 32 is applied to electrode 136 which is insulatingly supported in spaced relationship to nozzle 18 by supports such as 138, 139, 140. Two, three, four or more supports may be used. In general the fewer, having regard to stability, the better, to reduce electrical leakage. Electrode 136 is typically of conductive material, such as metal or plated plastics, but if the high voltage connection is extended to region of spray liquid deposit and the liquid is conductive an electrode of insulating material, as mentioned above, could be used.

Supports 138, 140 have distinct extra functions. Supports such as 139, if used, have only the support function. Support 138 provides a conduit for the high voltage supply connection 130 from unit 32. Support 140 is hollow and provides a suction connection to the aspirating means of electrode 136. The supports can conveniently be of plastic tube, to provide the required electrical insulation and mechanical properties, with the electrode 136 and frame 150 being push-fitted into the tube ends. The junction of connection 130 and electrode 136 is within tube 138 in use and is not shown. Frame 150 is also preferably of insulating material. The supports can be provided with integral or added ribs or other projections to shed liquid from the supports to reduce surface leakage via a conductive liquid film.

Portion 144 is hollow to continue the suction connection to tubing 146 which extends to the suction part of pump 48. In operation the flow of liquid through the aspiration means is generally a mixture of air and liquid as bubbles rather than the continuous liquid column of the liquid supply, so this will cause less electrical leakage than a continuous column and a shorter path is likely to be usable, simplifying the arrangement. A serpentine or coiled path formed by cooperating plastic mouldings may be used to provide the aspiration flow path 146 in a rigid compact form.

A guard 150 of light, plastics construction can be placed around the second electrode supports to prevent casual contact which could give a mild electric shock to an operator. The guard must not be so near electrode 136 as to interfere with its electrical action on the spray.

The electrode 36 has been described above as being of a round tube, some 5 mm in diameter, pierced by holes some 0.5 mm in diameter to enable liquid on the outside to be drawn into the interior of the tube for removal. While this arrangement is generally effective there are occasions when the recovery of liquid has to be improved. Also droplets can form on the outside and upset aspiration and charging.

Other forms of aspirating electrode suitable for use in this equipment include perforated tubes wrapped round with a porous material and electrodes extended so that aspiration of liquid takes place in a region where the electric field is less intense.

FIG. 4 shows a form of the electrode in FIG. 2 to which these additions have been applied. The elongate loop electrode is now an unperforated tube or rod 162 provided with a thin sheet extension 163 on each of the parallel limbs. A perforated tube 164 is provided on sheet 163 to be spaced from the nozzle, such as 20 of FIG. 2, so as to be in a region of less intense electric field. A layer of porous material 165 is wrapped around tube 164 to cover the perforations 169. (Layer 165 is shown partly cutaway.) The porous material may be retained by a clip 166 of plastics material or other suitable means. Conveniently the porous layer 165 is disposable and easily replaced with a new layer, e.g. for a different spray liquid. Tube 164 has an extension 167 onto which a flexible tube 168 can be pushed to provide a connection to the suction connector of a unit such as 48 of FIG. 1. The perforations 169 are relatively large compared with those such as 44 in FIGS. 1 and 2. When tube 164 is 10 mm in diameter, a suitable size, the perforations can be 4 mm in diameter. It has been found that small perforations, when covered by a drop of liquid, are sometimes ineffective in aspirating the liquid. This may be because the surface tension forces of the drop resist aspiration and uncovered adjacent perforations do not create a high enough resistance to aspiration of air to ensure that these forces are overcome. Large perforations would not solve the difficulty but a porous layer will be effective, provided a suitable porosity is used.

A similar sheet 163, tube 164, porous layer 165 and extension 167 are provided on the other limb. The end of the tube 164 is closed, as shown at 170. In other forms the tube 164 could be looped with a single extension 167 for the aspiration connection. The materials for the extensions and tubes can be chosen in the same manner as discussed above for the electrode itself.

The nature of the porous material must be considered as a hairy or easily frayed material can provide "whiskers" which act as discharges of the electric field. Plastics, foam sponge and some non-woven clothes have been found suitable.

The arrangements just described can be applied to other forms of nozzle e.g. those producing a circular spray cone. The surfaces of the sheet extensions 163 can help to reduce the number of unwanted large droplets lost from the spray particularly with hand-held use at varying angles as the operator directs the spray around the plants, trees or crop. Instead of a tube wrapped with a porous material a length of tube with a porous wall may be used. In either case the porous technique may be applied to electrodes, as shown in FIGS. 1, 2 and 3, without the extension sheets such as 163.

As typical operating conditions are 5 kV to 10 kV at a few tens of microamperes the electric shock receivable is not great, well below the accepted hazard levels by orders of magnitude. The power requirement is thus about 1 W per spray head. This can be met by dry-cell-powered oscillator-driven power units for single head portable units and makes quite modest demands on the vehicle electrical supply for a vehicle borne multiple head arrangement. Pump power for a single head is also not great. A supply pressure of some 400 KPa (approximately 60 psi) is needed with a suction of about 10 KPa (say 2 psi) for the aspirating of the electrode. For a portable unit the pump requirements might be met by intermittent hand pumping to prime a closed reservoir or by the use of a compressed air bottle charged before connection to the unit. It may be more convenient to collect the liquid aspirated from the electrode in a separate vessel than to return it continuously to a closed reservoir.

Arrangements of electrical and liquid supply have been described for a single spraying assembly which may be for hand-held or vehicle-borne use, such as that shown in the figures. It will be apparent that the charging voltage may be applied to any part of a conductive nozzle or at any point in the flow path of a conductive liquid. Consequently a multiple assembly such as would be useful for field spraying from a tractor can have either a separate supply to each head or a branching liquid supply to a group of heads with a single electrical input at or before the branching point.

We claim:

1. An electrostatic spraying apparatus, comprising:

a spray liquid supply means;

a spray head having a spray liquid inlet and a spray a first electrode and a second electrode, including means supporting said first and second electrode on said apparatus for applying an electrical potential difference proximally of said spray exit, whereby emergent spray is inductively electrically charged;

said first electrode being associated with said spray head and arranged to be in electrical contact with spray liquid supplied by said spray liquid supply means to said spray head;

said second electrode comprising a hollow body having a wall provided with at least one aperture through which liquid deposited exteriorly on said wall may pass to the interior of said hollow body;

said second electrode being arranged in spaced relation to said spray exit; and asperating means associated with the interior of said hollow body for removing liquid deposited on said second electrode by drawing such liquid through said at least one aperture.

2. An apparatus according to claim 1, wherein:

said spray liquid supply means includes a spray liquid reservoir and pump means for forcing liquid from said reservoir to said spray head; and said apparatus further includes means for supporting said apparatus in a spray delivering configuration for directing delivery of charged spray liquid from said spray exit of said spray head.

3. An apparatus according to claim 1 in which at least part of the hollow body is made of conductive material, for use with a non-conductive spray liquid.

4. An apparatus according to claim 1 in which the first electrode is constructed and arranged for use at a potential other than earth potential and the spray liquid supply means includes a spray liquid container and a long liquid flow path means between the container and spray head liquid inlet to restrict electrical leakage from the electrode through the liquid flow path means and any liquid therein.

5. An apparatus according to claim 4 in which the long liquid flow path means includes a length of electrically insulating tube.

6. An apparatus according to claim 4 in which the long liquid flow path includes a convoluted path through a body of insulating material.

7. An apparatus according to claim 4 in which the spray liquid supply means includes an earthed spray liquid container.

8. An apparatus according to claim 1 in which the aspirating means includes aspiration flow path means from the aspirating means electrode to a source of reduced pressure to apply the reduced pressure at said at least one electrode to remove the liquid, the flow path means also being constructed and arranged to convey removed liquid over at least part of its length.

9. An apparatus according to claim 8 in which the electrode provided with aspirating means is for use at a potential other than earth potential and the aspiration flow path means is long to reduce electrical leakage from the electrode through the flow path means and any liquid therein.

10. An apparatus according to claim 8 or claim 9 in which the removed liquid is returned to the spray liquid supply means.

11. An apparatus according to claim 8 in which the source of reduced pressure is a liquid jet pump such as an ejector operated by the spray liquid supply means.

12. An apparatus according to claim 1 in which the second electrode is at earth potential.

13. An apparatus according to claim 12 in which the second electrode also forms a guard against contact by an operator with non-earth potential parts of the apparatus.

14. An apparatus according to claim 1 in which the spray head has a single said spray exit to produce a spray having one shape of a hollow cone, a solid cone, a hollow fan and a solid fan and the second electrode has the form of a loop conforming to the shape of the spray to preserve a substantially uniform spacing between the spray surface and the nearest point of the second electrode.

15. An apparatus according to claim 1 in which the second electrode includes at least a portion formed of porous material for the receipt of deposited liquid and providing through the pores of the material means for the passage of deposited liquid by the action of the aspirating means for removal.

16. An apparatus according to claim 15 including in the second electrode support means to support the porous material portion away from the spray exit.

* * * * *